United States Patent [19]

Kitaide et al.

[11] Patent Number: 4,745,245

[45] Date of Patent: May 17, 1988

[54] METHOD AND APPARATUS FOR THE MANUFACTURE OF A CLAD TUBE THROUGH USE OF INDUCTION HEATING

[75] Inventors: Hiromu Kitaide; Michio Kawasaki, both of Suzuka Mie, Japan

[73] Assignee: Fuji Electric Co., Ltd., Kawasaki, Japan

[21] Appl. No.: 10,497

[22] Filed: Feb. 3, 1987

Related U.S. Application Data

[63] Continuation-in-part of Ser. No. 925,304, Oct. 31, 1986, abandoned.

[51] Int. Cl.$^4$ ............................................. H05B 6/10
[52] U.S. Cl. ................................... 219/8.5; 219/10.4; 219/9.5; 219/10.67; 219/10.490; 228/131
[58] Field of Search ............... 219/8.5, 9.5, 7.5, 10.53, 219/10.41, 10.43, 10.57, 10.71, 10.49 R, 10.67; 228/131, 132, 219

[56] References Cited

U.S. PATENT DOCUMENTS

| | | | |
|---|---|---|---|
| 2,767,290 | 10/1956 | Chapman et al. | 219/9.5 |
| 2,975,259 | 3/1961 | Osborn, Jr. | 219/9.5 |
| 3,462,336 | 8/1969 | Leatherman | 219/10.53 X |
| 3,532,476 | 10/1970 | Peghs et al. | 219/10.53 X |
| 4,227,061 | 10/1980 | Westfall et al. | 219/9.5 |
| 4,234,781 | 11/1980 | Flink | 219/10.53 X |
| 4,317,978 | 3/1982 | Nebesar | 219/10.71 |
| 4,442,331 | 4/1984 | Watanabe | 219/10.43 |
| 4,533,806 | 8/1985 | Kawasaki et al. | 219/8.5 |

Primary Examiner—Philip H. Leung
Attorney, Agent, or Firm—Brumbaugh, Graves, Donohue & Raymond

[57] ABSTRACT

A method is provided for manufacturing a clad tube comprising a metallic tube coated on the interior surface with a thermally deformable coating material, comprising:

(a) coaxially positioning the metallic tube within a cylindrically formed induction coil;

(b) coaxially positioning a tube of the coating material within the metallic tube;

(c) applying a current to the induction coil such that the induction coil serves as a heater and heats the metallic tube which in turn radiantly heats the tube of coating material to a temperature sufficient to make the coating material deformable; and (d) applying pressure on the interior of the tube of coating material such that the softened tube of coating material deforms to contact and fuse with the interior surface of the metallic tube to form a clad tube. The coating material can be, for example, glass or a thermally deformable resin. Optionally, a magnetic tube can be inserted into the interior of the tube of coating material. In this case, both the metallic tube and the magnetic tube can be heated by the induction coil, and both can act to radiantly heat the tube of coating material.

12 Claims, 7 Drawing Sheets

TEMPERATURE   CENTER OF COIL
DISTRIBUTION

TEMPERATURE CENTER OF COIL
DISTRIBUTION

METHOD AND APPARATUS FOR THE MANUFACTURE OF A CLAD TUBE THROUGH USE OF INDUCTION HEATING

This application is a continuation-in-part of U.S. patent application Ser. No. 925,304 filed Oct. 31, 1986, now abandoned.

BACKGROUND OF THE INVENTION

This invention relates to a method and apparatus for the manufacture of clad tubes wherein a coating of a thermally deformable material is fused to the interior surface of a metallic tube.

Clad tubes are known in which a glass coating covers the interior of a metallic, for example steel, tube. According to methods known in the art, these clad tubes are formed by inserting a glass tube that is closed at one end into a steel tube, and placing the combination in a heating oven filled with an atmosphere resulting from the combustion of gas or heavy oil. The glass tube is softened by the heat, and then pressure is applied within the tube, causing the glass tube to inflate and fuse with the interior of the steel tube.

The initial set up for such a known fusing method is shown in FIG. 1, wherein 31 denotes a glass tube having a closed end 31a and a shaped end 31b. The shaped end is thermally deformed to form a nozzle to facilitate application of pressure to the interior of the softened glass tube. The glass tube 31 is positioned coaxially within a steel tube 2.

The known method of forming clad tubes has several drawbacks. In the first place, the glass tube 31 must be preformed to have a closed end 31a and a shaped end 31b. This necessitates the time consuming process of cutting a molded glass pipe to a selected length, reheating the two ends of the pipe and closing one end and shaping the other before the glass tube can be used in the process.

Secondly, the use of an oven to heat and soften the glass tube is inefficient, from the standpoint of both the time required to achieve softening and the difficulty of temperature control. Furthermore, clad tubes formed by this technique are prone to have bubbles which lower the utility of the coated tubing.

It is therefore an object of this invention to overcome these and other difficulties by providing a method and apparatus for forming clad tubes in which thermally deformable tubes that are open at both ends can be utilized in the manufacture of clad tubes.

It is a further object of the invention to provide a method and apparatus for manufacturing clad tubes in which an oven is not used to soften the tube of coating material.

BRIEF DESCRIPTION OF THE INVENTION

According to the invention, a method is provided for manufacturing a clad tube comprising a metallic tube coated on the interior surface with a thermally deformable coating material, comprising:

(a) coaxially positioning the metallic tube within a cylindrically formed induction coil;

(b) coaxially positioning a tube of the coating material within the metallic tube;

(c) applying a current to the induction coil such that the induction coil serves as a heater and heats the metallic tube which in turn radiantly heats the tube of coating material to a temperature sufficient to make the coating material deformable; and (d) applying pressure on the interior of the tube of coating material such that the softened tube of coating material deforms to contact and fuse with the interior surface of the metallic tube to form a clad tube. The coating material can be, for example, glass or a thermally deformable resin.

Optionally, a magnetic tube can be inserted into the interior of the tube of coating material. In this case, both the metallic tube and the magnetic tube can be heated by the induction coil, and both can act to radiantly heat the tube of coating material.

The invention also encompasses an apparatus for manufacturing clad tubes in accordance with the above-described method. The apparatus according to the invention includes means for maintaining a tube of coating material coaxially positioned within a metallic tube; separable means for tightly closing the tube of coating material at both ends; means for applying pressure to the interior of the tube of coating material; and means for heating the metallic tube, wherein the heated metallic tube radiantly heats the tube of coating material positioned therewithin such that the tube of coating material becomes deformable. In particular, the apparatus according to the invention utilizes an induction coil coaxially surrounding the position for the metallic tube as the heating means.

DETAILED DESCRIPTION OF THE INVENTION

Figure 1:
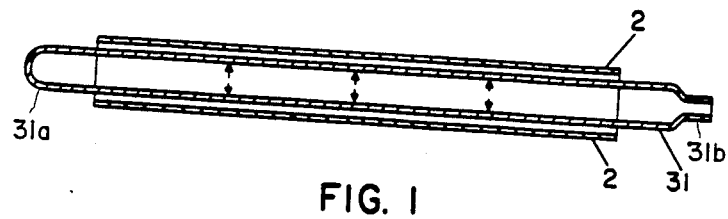
FIG. 1 shows in cross section the arrangement of tubes for forming a clad tube in accordance with a prior art method.
Figure 2:
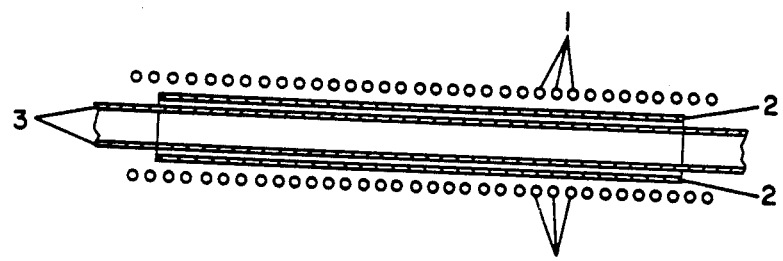
FIG. 2 shows in cross section an arrangement of tubes for forming a clad tube in accordance with the invention.

FIG. 2 depicts a working example of the present invention. As illustrated in the FIG. 2, a metallic tube 2, preferably of steel such as stainless steel, is inserted through the interior of an induction coil 1. A glass tube 3 is inserted through the interior of the metallic tube 2 and these three components are coaxially supported in position. The outside diameter of the glass tube 3 is slightly smaller than the inside diameter of the metallic tube 2 to facilitate insertion.

When an electric current of high frequency on the order of 1,800 Hz is passed through the induction coil 1, an induced electric current flows through the metallic tube 2 disposed inside the induction coil 1. Owing to thermal losses in the flow of electric current, the metallic tube 2 generates heat. The metallic tube 2 thus serves as a heater to radiantly heat the glass tube 3.

Figure 3:
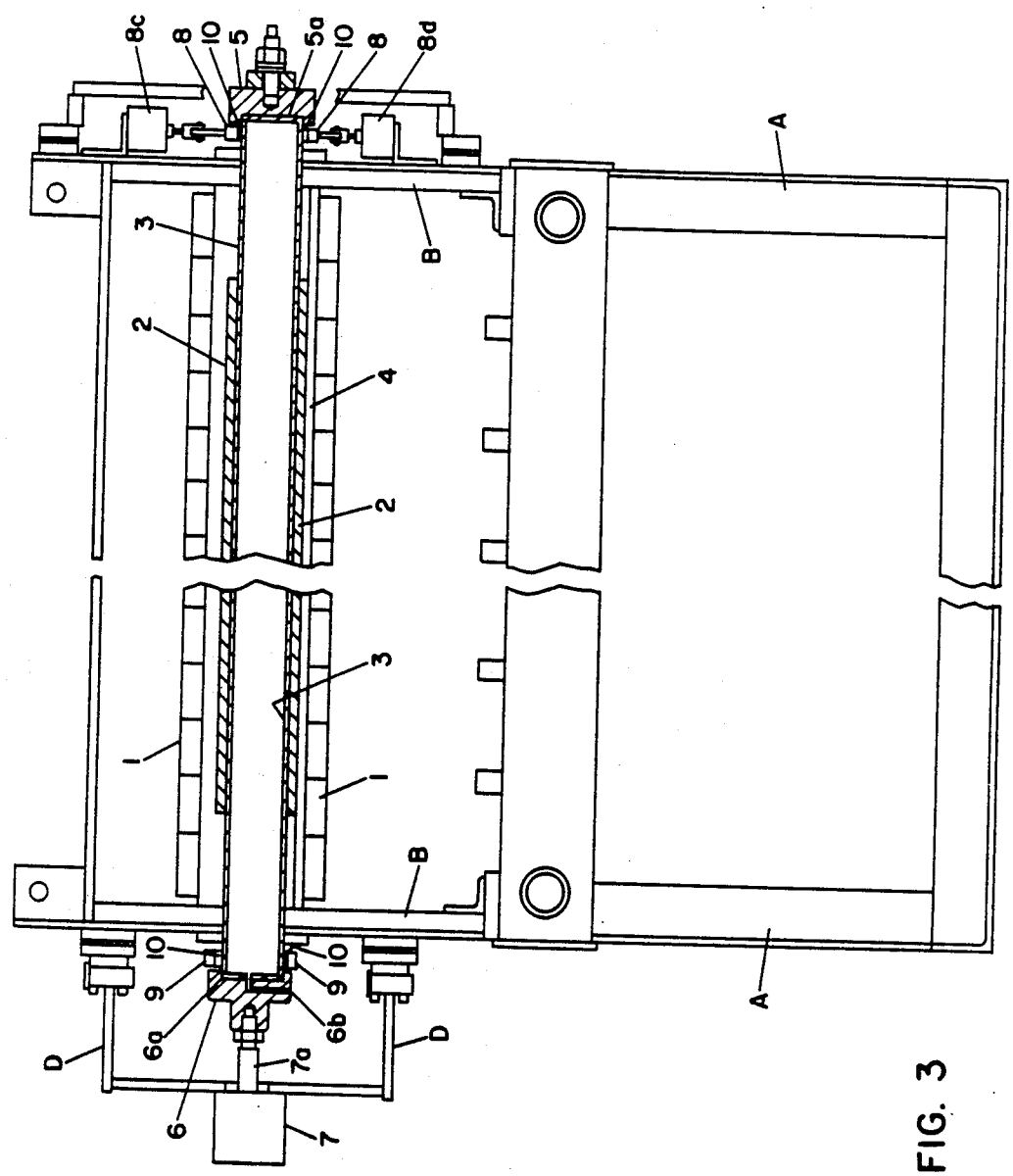
FIG. 3 shows an apparatus for manufacturing a clad tube in accordance with the invention.

FIG. 3 illustrates a typical apparatus for the manufacture of a clad tube by the use of the aforementioned induction coil, with the metallic tube 2 and glass tube 3 in place. The parts which have equivalents in FIG. 2 are denoted by the same reference numerals.

As shown in FIG. 3, induction coil 1 is supported in a horizontal orientation by frame B erected on the apparatus base. On the lower side of the interior of the induction coil 1, a skid rail 4 is disposed in a horizontal orientation. The skid rail 4 is adapted to facilitate the insertion and extraction of the metallic tube 2, and of the glass tube 3 which is inserted through the metallic tube 2.

When used in the apparatus of FIG. 3, the glass tube 3 has a length greater than the length of the metallic tube 2. This length of the glass tube 3 is such that when the glass tube is inserted in the induction coil 1, the glass tube 3 will protrude to a prescribed length from each of the opposite ends of the heating zone delimited by the frames B. The protruding ends of the glass tube are sealed using a stationary cap 5 and a movable cap 6. The caps also function to support the glass tube 3 in coaxial alignment with the induction coil 1 and the metallic tube 2.

Figure 5:
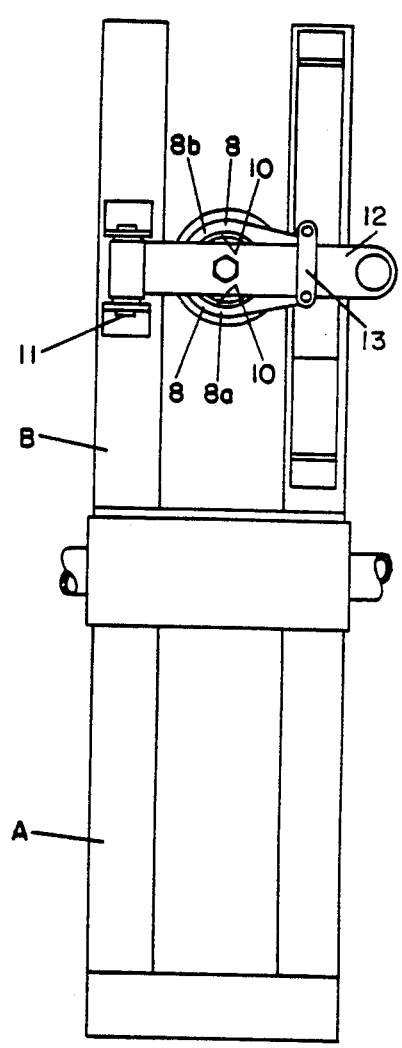
FIG. 5 is a side view of the right side of the apparatus shown in FIG. 3.

The stationary cap 5 has a packing zone 5a which contacts one end of the glass tube 3 during manufacture of the clad tube. As shown in FIG. 5, stationary cap 5 is affixed to a bracket 12 which is rotatably attached to the frame B via a hinge member 11. This permits the stationary cap 5 to be swung into contact with one end of the glass tube 3. The bracket 12 can be fixed in position using fastener 13 when the apparatus is in use.

The movable cap 6 is used to seal the other end of the glass tube 3. Like the stationary cap 5, the movable cap 6 has packing zone 6a. In addition, movable cap 6 includes a means for introducing a gas into the interior of the glass tube 3, such as nozzle 6b (FIG. 3). The movable cap 6 is connected to the leading end of a piston 7a of an air cylinder 7 secured on a frame D, which enables movement of movable cap 6 in a horizontal direction as a consequence of the elongation and contraction of the piston 7a of the cylinder 7.

In addition to the caps, crampers 8 and 9 are provided to hold the glass tube 3 in position. Crampers 8 and 9 are disposed near the packings 5a and 6a respectively and are each formed of an upper arm 8b (9b) and a lower arm 8a (9a).

Figure 4:
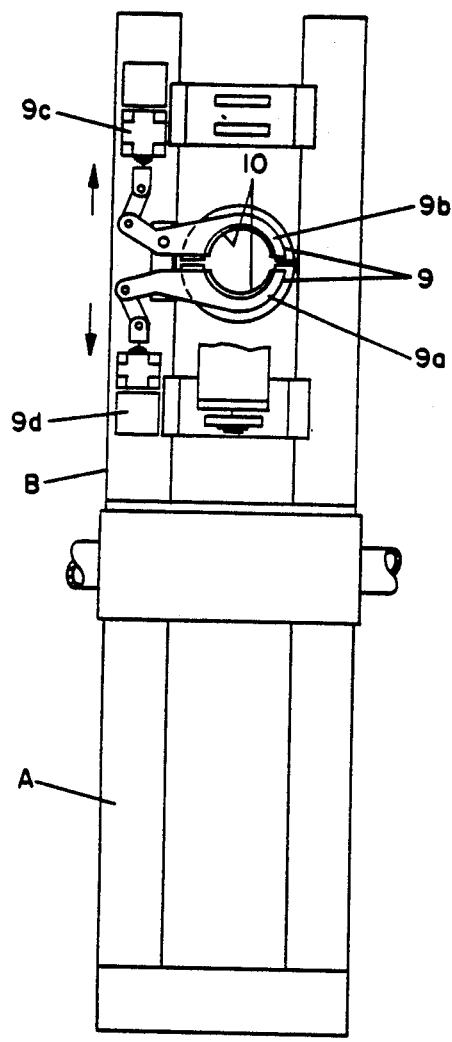
FIG. 4 is a side view of the left side of the apparatus shown in FIG. 3.

Cylinders 8c (9c) and 8d (9d), affixed to the frame B, allow the arms 8a (9a) and 8b (9b) to be opened or closed. When the arms 8a (9a) and 8b (9b) are closed, a force is uniformly exerted in the direction of the radial center of the glass tube 3. Crampers 8 and 9 actually contact stationary members 10 which in turn contact the glass tube 3 so as to prevent the glass tube 3 from being displaced in the horizontal direction. The crampers 8 and 9, as illustrated in the side views of FIG. 4 and FIG. 5, each have the mechanism of linkage so that they may be loosened during the attachment the glass tube 3 to the apparatus.

The method for the operation of the apparatus described is as follows, first, the stationary cap 5 and the bracket 12 are rotated out of the way such that the metallic tube 2 and the glass tube 3 can be inserted into the induction coil. The metallic tube 2 is mounted on the skid rail 4 at the central position inside the induction coil 1. Then, the glass tube 3 is inserted through the interior of the metallic tube 2. In this case, the movable cap 6 side of the glass tube 3 is allowed to protrude to a slightly greater distance than the opposite side thereof. Subsequently, the radial center of the glass tube 3 and that of the induction coil 1 are made to coincide substantially with each other by the crampers 8 and 9.

The crampers 8 and 9 are tightened around the glass tube 3 to such an extent that the glass tube 3 may be readily moved by the force exerted in the axial direction from the movable cap 6 side. Then, the bracket 12 is turned such that the right-hand end of the glass tube 3 is aligned with packing zone 5a on the inner surface of the stationary cap 5. Further rotation of the bracket 12 is prevented by attaching the fastener 13 onto the frame B.

In the meantime, the movable cap 6 is moved by the cylinder 7 to bring the right-hand end of the glass tube 3 into contact with the stationary cap 5 and the left-hand end of the glass tube 3 into contact with the movable cap 6. By exertion of the force in the axial direction, the packings 5a and 6a are caused to seal the opposite ends of the glass tube 3. Then, the crampers 8 and 9 fitted around the glass tube 3 are fully tightened so that when the glass tube 3 is softened by the subsequent heating, the glass tube 3 will not be displaced by the force exerted by the cylinder 7 in the axial direction and the seals at the opposite end parts of the glass tube 3 will be retained effectively.

The lower arms 8a and 9a of the crampers 8 and 9 are adjusted so that the glass tube 3 will remain centered during actuation of cylinders 8d and 9d attached to lower arms 8a and 9a. The upper arms 8b and 9b are tightened, although to lesser extent than the lower arms 8a and 9a, so as to prevent the crampers 8 and 9 from being displaced out of the their fixed positions.

After completion of the preparation described above, an AC electric power is applied to the induction coil 1 to start induction heating of the metallic tube 2. Consequently, the glass tube 3 is heated to a prescribed temperature sufficient to soften the glass (in the range of 600° to 800° C.) with the radiant heat from the heated metallic tube 2. An inert gas is introduced through the nozzle 6b into the interior of the glass tube 3 to exert pressure on the inner surface of the glass tube 3, with the result that the softened glass tube 3 will be inflated and fused with the interior surface of the metallic tube 2 to form a clad tube. The application of pressure to the interior of the glass tube 3 may be effected before or after the glass tube 3 is heated to the aforementioned prescribed temperature.

Following formation of the clad tube, the crampers 8 and 9 and the stationary cap 5 and movable cap 6 are loosened to release the cramped and sealed parts. At the same time, the bracket 12 is swung open and the clad tube is taken out.

In this example, the coating on the interior of the metallic tube is made of glass. Optionally, the glass tube in this and subsequent examples may be replaced with a pipe made of a thermally deformable resin.

In the method and apparatus just described, packings are disposed one each at the opposite open end surfaces of the glass tube as a means of tightly closing the tube.

These packings exert an accurately controlled force in the axial direction upon the glass tube 3. In order that the glass tube, which may have a wall thickness as small as 3 mm, may endure the aforementioned force extend thereon in the axial direction when it is softened by the heating, the crampers which uniformly surround the glass tube toward the radial center of the glass tube near the aforementioned packings possess sufficient flexibility to absorb the force. At the same time, the crampers actually contact the glass tube through the stationary members 10 which have a large enough friction coefficient to withstand the axially exerted force.

In using the method and apparatus described above, it will sometimes be the case that uniform heating of the metallic tube will be sufficient. For example, when the glass tube to be used is relative short, the temperature distribution in the glass tube which results from uniform heating of the metallic tube is such that the temperature of the central part thereof is higher than that of the opposite end parts. As the glass tube increases in length, however, the temperature distribution will be such that the temperature is uniform throughout the entire length as illustrated in FIG. 6(A) or, less desirably, the temperature may be higher in the opposite end parts than in the central part as illustrated in FIG. 6(B).

Figure 8:
FIG. 8(A), FIG. 8(B), FIG. 8(C), FIG. 8(D), and FIG. 8(E) illustrate desirable heat distributions and the formation of clad tubes under these conditions.
Figure 8:
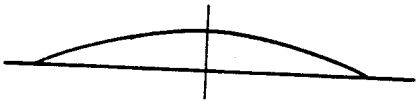
Figure 8:
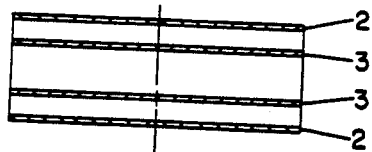
Figure 8:
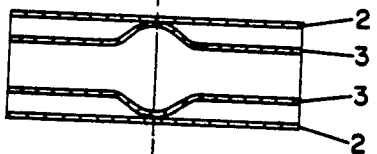
Figure 8:
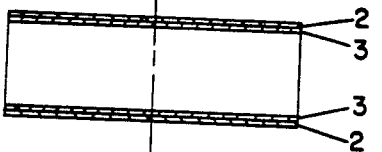

When the glass tube 3 of FIG. 6(C) having a temperature distribution such as depicted in FIG. 8(A) or (B) is exposed to the pressure, the glass tube 3 begins to undergo fusion with the steel tube 2 at portions other than the central part as illustrated in FIG. 6(D) and (E). As a result, gas is entrapped in the central part between the glass tube 3 and the metallic tube 2. In addition, the central part of the glass tube 3 may not be fused with the metallic tube 2.

Figure 6:
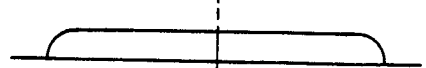
FIG. 6(A), FIG. 6(B), FIG. 6(C), FIG. 6(D), and FIG. 6(E) illustrate undesirable heat distributions and the formation of clad tubes under these conditions.
Figure 6:
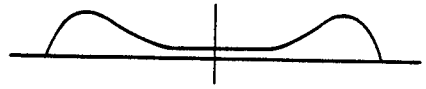
Figure 6:
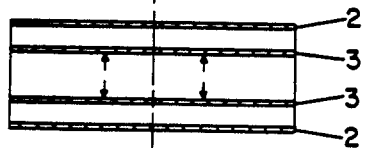
Figure 6:
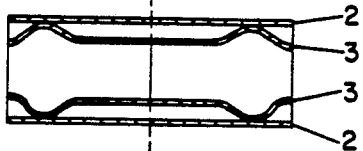
Figure 6:
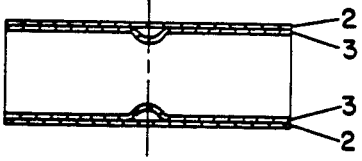
Figure 7:
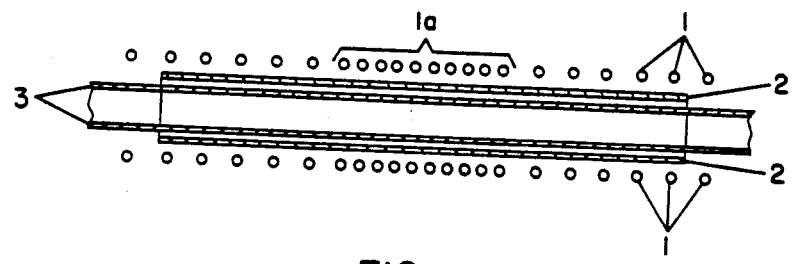
FIG. 7 is a cross-section of a second heating device in accordance with the invention.

FIG. 7 depicts a second working example of the invention which overcomes the problems depicted in FIG. 6. In FIG. 7, the induction coil 1 is wound densely in the central part 1a thereof and sparsely in the opposite end parts. The temperature distribution resulting from this uneven winding of the induction coil 1 is such that the temperature is higher in the central part of the coil, i.e. the central part in the axial direction of the metallic tube 2 is hotter than the opposite end parts as illustrated in FIG. 8(A) or (B). The temperature difference preferably falls in the range of 30° to 100° C.

When the glass tube of FIG. 8(C) having a temperature distribution as shown in FIG. 8(A) or (B) is subjected to application of pressure with the inert gas, the glass tube 3 is initially inflated and fused with the metallic tube 2 in the central part thereof which is at a higher temperature as shown in FIG. 8(D). Thereafter, the sites of fusion gradually shift from the central part to the opposite end parts. Unlike the conventional method of clad tube manufacture, therefore, the glass tube 3 has no possibility of entrapping the gas between itself and the metallic tube 2. Thus, the glass tube 3 produces uniform fusion with the metallic tube 2 as illustrated in FIG. 8(E).

Figure 9:
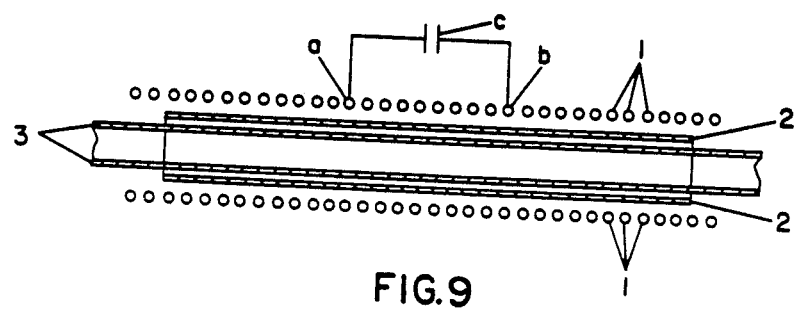
FIG. 9 is a cross-section of a further heating device in accordance with the invention.

FIG. 9 depicts another means for achieving the desirable heat distribution pattern described above. As shown in the diagram, the induction coil 1 is wound at a fixed pitch. To enable this induction coil 1 to give the metallic tube 2 a temperature distribution such that the central part thereof will have a higher temperature, a condenser C is connected to the central part of the induction coil 1, specifically to coil pieces a and b disposed at the opposite ends of the portion of the induction coil corresponding to the densely wound portion of the induction coil of FIG. 7. When the capacitance of this condenser C is so fixed that it will generate a parallel resonance with the reactance between the coil pieces a and b, the magnitude of electric current flowing between the coil pieces a and b is greater than that of the electric current flowing in the remaining portion of the coil. This results in the metallic tube 2 having a temperature distribution in which the central part of the metallic tube 2 has higher temperature than the opposite end parts thereof.

Figure 10:
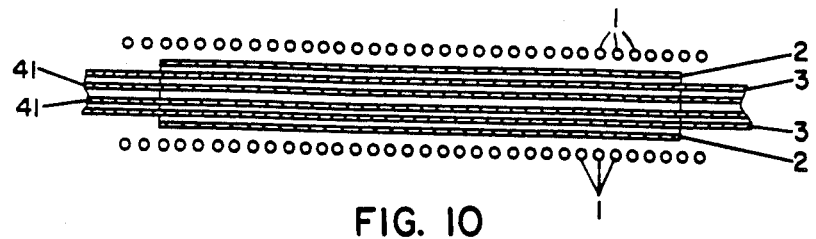
FIG. 10 is a cross-section of another heating device in accordance with the invention.

FIG. 10 depicts another working example of this invention. As illustrated, a metallic tube 2 is coaxially inserted into the interior of an induction coil 1, a glass tube 3 is similarly inserted inside the metallic tube 2, and a magnetic tube 41 intended for accelerating heating is similarly inserted inside the glass tube 3. When an electric current of high frequency on the order of 1,800 Hz is passed through the induction coil 1, an induced electric current flows through the metallic tube 2 and the magnetic tube 41 adapted for acceleration of heating and disposed inside the glass tube 3. As the result, the glass tube is heated with radiant heat generated from both the metallic tube 2 and the magnetic tube 41.

In this embodiment of the invention, the glass tube 3 is heated simultaneously on the outside and the inside and, therefore, the temperature of the glass tube 3 is elevated to a prescribed temperature sufficient to soften the glass (in the range of 600° to 800° C.) in a short span of time.

The use of a magnetic tube 41 placed within the glass tube 3 can also provide other advantages in accordance with the invention. In the circumstance that the temperature required to soften the glass is high, it can deform the metallic tube 2, possibly to an extent of jeopardizing the dimensional accuracy, or can cause unwanted transformation of the metallic tube, possibly to an extent of impairing the corrosion proofness of the metallic material. Differential heating of the metallic tube 2 and the magnetic tube 41 may therefore be desirable. For example, a steel pipe can be prevented from being heated to the aforementioned high temperature, while the magnetic tube 41 is being selectively heated to the high temperature by demagnetizing the steel pipe and giving the magnetic tube 41 a thickness in the range of 1 to 3 mm.

The preferred temperature difference between the metallic tube 2 and the magnetic tube 41 falls in the range of 100° to 150° C. A proper setting of this temperature difference can be easily established by adjusting the frequency of the power to be fed to the induction coil 1.

Figure 11:
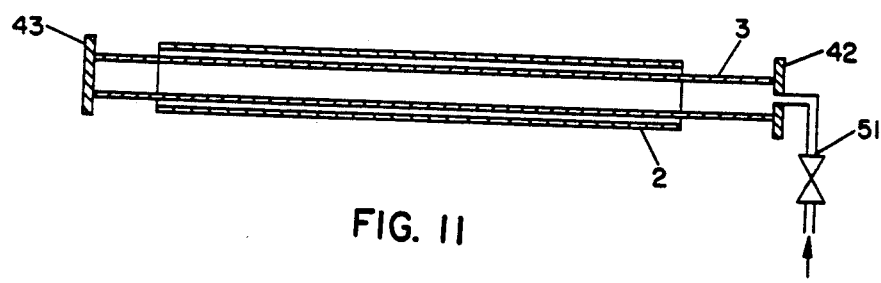
FIG. 11 is a cross-section of another embodiment of the invention.

FIG. 11 depicts yet another working example of this invention. As illustrated in FIG. 11, a glass tube 3 is cut to a prescribed size. The outside diameter of this glass tube 3 is slightly smaller than the inside diameter of a metallic tube 2 so that the glass tube 3 may be safely inserted inside the steel tube 2. The glass tube 3 has a greater length than the metallic tube 2 so that the glass tube inserted through the metallic tube 2 may protrude to a prescribed length from either end part of the metallic tube 2. The glass tube 3 is provided at the opposite ends thereof with separable lids 42 and 43 capable of resisting heat and hermetically sealing the air inside the glass tube 3. The lid 42 is provided with a pressure device 51 adapted to deliver pressure through the lid 42 and exert it on the interior of the glass tube 3.

As concerns a practical method for the manufacture of a clad tube, first the valve of the pressure device 51 is closed and the glass tube 3 is hermetically sealed with air inside. Then, a heating device (not shown) disposed outside the metallic tube 2 is turned on to heat the glass tube 3 by radiant heat from the steel tube 2 until the glass tube 3 is softened. Then, the valve of the aforementioned pressure device 51 is opened to start exertion of stated pressure on the interior of the glass tube 3 and thereby to cause the glass tube 3 to be inflated radially and eventually fused with the inner side of the metallic tube 2.

Alternatively, the exertion of the pressure on the interior of tube 3 may be carried out while heating of the glass tube 3 is in process.

This method provides an alternative to the apparatus described hereinabove for the manufacture of a clad tube from glass tube that is open at end parts thereof. Both the method and apparatus provide separable means of tight closure, which facilitate the application of pressure on the interior of the softened glass tube thereby enabling an open-ended glass tube to be inflated radially and eventually fused with the inner side of the metallic tube. This method, therefore, avoids the heretofore inevitable work of shaping the opposite end parts of the glass tube. Since it can use a plain glass tube having open ends, there is derived an effect of producing the clad tube at a flow cost.

Figure 12:
FIG. 12 is a cross-section of a finished clad tube useful as an ozone generator.

Once the clad tube is formed in accordance with the invention, it may be desirable to cut of the protruding ends of the glass tube 3. For example, FIG. 12 depicts a clad tube obtained by cutting off the portions of the glass tube 3 protruding from the opposite ends of the metallic tube 2 after the aforementioned fusion is completed. This clad tube may be used as an ozone generating tube for an ozone generator, for example.

As described above, the present invention contemplates producing a clad tube by inserting inside a metallic tube a tube of a thermally deformable material of greater length, indirectly heating the glass tube with the radiant heat from the metallic tube, and applying pressure on the interior of the heated and softened glass tube.

The various embodiments described above demonstrate the effectiveness of the invention in allowing the use of open-ended glass tubes to form clad tubes in a manner which is rapid and produces a high quality product. The various embodiments described are in no way intended to limit the scope of the invention as set forth in the claims.

We claim:

1. A method for manufacturing a clad tube comprising:
   (a) coaxially positioning a metallic tube within a cylindrically formed induction coil;
   (b) coaxially positioning a tube of a thermally deformable coating material within the metallic tube;
   (c) positioning a magnetic tube within the tube of coating material;
   (d) applying a current to the induction coil such that the induction coil serves as a heater and heats the metallic tube and the magnetic tube which in turn radiantly heat the tube of coating material to a temperature sufficient to make the coating material deformable; and
   (e) applying pressure on the interior of the tube of coating material such that the tube of coating material deforms to contact and fuse with the interior surface of the metallic tube to form a clad tube.

2. A method according to claim 1, wherein the thermally deformable coating material is glass or a thermally deformable resin.

3. A method according to claim 1, wherein the induction coil is adapted such that a higher temperature is attained in an axially central portion of the induction coil than is attained in the end portions of the induction coil.

4. A method according to claim 3, wherein the metallic tube and the magnetic tube are heated to different temperatures.

5. A method according to claim 1, wherein the metallic tube and the magnetic tube are heated to different temperatures.

6. A method according to claim 1, wherein the tube of coating material is open at both ends further comprising the step of tightly closing both ends of the tube of coating material with separable means of tight closure, such that pressure can be applied within the tube of coating material.

7. A method according to claim 6, wherein the separable means of tight closure includes a means for introducing a gas into the interior of the tube of coating material.

8. A method according to claim 7, further comprising the step of introducing an inert gas into the interior of the tube of coating material through the means provided in the separable means of tight closure.

9. An apparatus for the manufacture of a clad tube comprising:
   (a) means for maintaining a tube of a thermally deformable coating material in a fixed horizontal orientation relative to a supporting frame;
   (b) means for maintaining a metallic tube coaxially surrounding the tube of coating material;
   (c) closure means for tightly closing said tube of coating material at both ends;
   (d) means for applying pressure to the interior of said tube of coating material;
   (e) means for inductively generating heat adapted to be coaxially surrounding the metallic tube,; and
   (f) a magnetic tube and means for maintaining said magnetic tube coaxially positioned within the tube of coating material, wherein upon passage of current, the means for inductively generating heat acts to heat both the metallic tube and the magnetic tube such that the tube of coating material is radiantly heated to a uniform temperature where it is deformable.

10. An apparatus according to claim 9, wherein said heating means is an induction coil.

11. An apparatus according to claim 10, wherein said means for applying pressure is a hole passing through said closure means at one end of the tube of coating material, said hole being connectable to a source of gas.

12. An apparatus according to claim 10, wherein said induction coil is adapted such that a higher temperature is attained in an axially central portion of the induction coil than is attained in the ends of the induction coil.

* * * * *